US009133863B2

(12) United States Patent
Chi

(10) Patent No.: US 9,133,863 B2
(45) Date of Patent: Sep. 15, 2015

(54) OPTIMIZED HYDRAULIC CONTROL DEVICE FOR MINIMIZING LOCKING OF A BRAKE SYSTEM IN A TWO-WHEELED VEHICLE

(75) Inventor: Dong Ik Chi, Anyang-si (KR)

(73) Assignee: Dong Ik Chi, Anyang-si (KR)

( * ) Notice: Subject to any disclaimer, the term of this patent is extended or adjusted under 35 U.S.C. 154(b) by 50 days.

(21) Appl. No.: 14/113,999

(22) PCT Filed: Nov. 17, 2011

(86) PCT No.: PCT/KR2011/008783
§ 371 (c)(1),
(2), (4) Date: Nov. 1, 2013

(87) PCT Pub. No.: WO2012/148057
PCT Pub. Date: Nov. 1, 2012

(65) Prior Publication Data
US 2014/0047830 A1    Feb. 20, 2014

(30) Foreign Application Priority Data

Apr. 25, 2011  (KR) .................. 10-2011-0038523

(51) Int. Cl.
*B60T 8/26*    (2006.01)
*F15B 15/00*   (2006.01)
*B60T 8/92*    (2006.01)
*B60T 17/18*   (2006.01)

(52) U.S. Cl.
CPC . *F15B 15/00* (2013.01); *B60T 8/26* (2013.01); *B60T 8/261* (2013.01); *B60T 8/92* (2013.01); *B60T 17/18* (2013.01)

(58) Field of Classification Search
CPC ........... B60T 8/261; B60T 8/30; B60T 8/306; B60T 8/262; B60T 8/265; B60T 8/1831; F16K 17/06; F16D 2127/08; F16D 2127/085
USPC .................................................. 137/498, 530
See application file for complete search history.

(56) References Cited

U.S. PATENT DOCUMENTS 3,169,800 A  *  2/1965  Oberthur ...................... 303/9.69
3,260,557 A  *  7/1966  Lepelletier et al. ............. 303/49
3,444,888 A  *  5/1969  Madden ........................ 137/542
(Continued)

FOREIGN PATENT DOCUMENTS

GB           1011376 A    * 11/1965    ............ F16K 15/063
JP       10-175540 A       6/1998
(Continued)

OTHER PUBLICATIONS

English Translation of International Search Report from PCT/KR2011/008783; dated Apr. 4, 2012.

*Primary Examiner* — Bradley King
*Assistant Examiner* — Stephen Bowes
(74) *Attorney, Agent, or Firm* — Baker & Hostetler LLP

(57) ABSTRACT

The present invention relates to a hydraulic control device for an antilock brake system, which is capable of maintaining a certain amount of braking performance even in the event of a disturbance or repeated use, by enabling the restriction of the displacement of a control bolt to a certain range. Therefore, through the present invention, braking ability is not lost under any circumstances, and accidents caused by a loss of braking function due to the malfunctioning of a hydraulic control device for an antilock brake system can be averted.

3 Claims, 4 Drawing Sheets

(56) References Cited

U.S. PATENT DOCUMENTS

| | | | | |
|---|---|---|---|---|
| 4,219,242 | A | * | 8/1980 | Carre .......................... 303/9.73 |
| 4,971,402 | A | * | 11/1990 | Chen .......................... 303/113.1 |
| 5,150,772 | A | * | 9/1992 | Pantale et al. ................ 188/72.4 |
| 6,357,838 | B1 | * | 3/2002 | Chi ............................ 303/116.2 |
| 2004/0155521 | A1 | * | 8/2004 | Kim et al. ...................... 303/87 |
| 2007/0181190 | A1 | * | 8/2007 | Klein ...................... 137/543.15 |

FOREIGN PATENT DOCUMENTS

| | | | |
|---|---|---|---|
| KR | 10-2001-0029581 | A | 4/2001 |
| KR | 20-0240213 | Y1 | 10/2001 |
| KR | 10-2001-0094859 | A | 11/2001 |
| KR | 10-0430172 | B1 | 8/2004 |

* cited by examiner

OPTIMIZED HYDRAULIC CONTROL DEVICE FOR MINIMIZING LOCKING OF A BRAKE SYSTEM IN A TWO-WHEELED VEHICLE

CROSS-REFERENCE TO RELATED APPLICATIONS

This application is a National Stage of International Patent Application No. PCT/KR2011/008783, filed Nov. 17, 2011 and claims priority to foreign application KR 10-2011-0038523, filed Apr. 25, 2011, the content of which are incorporated herein by reference in their entirety.

TECHNICAL FIELD

The present invention relates to a hydraulic control device employed in a brake system for antilocking, and more specifically to a hydraulic control device of a brake system for a two-wheeled vehicle in which a pressure can be maintained at or below the lock point, because a pressure transmitted to the wheel cylinder is set at or below the pressure immediately before being locked, so that the pressure above the set pressure is shut off.

BACKGROUND ART

The main causes of a two-wheeled vehicle accident are speeding and an inefficient braking force. Also during ordinary driving, if sudden braking due to an emergency situation is applied to a rear wheel, a decreased coefficient of friction between a road surface and a tire increases the braking distance to potentially cause an accident. When a front wheel is locked, the two-wheeled vehicle, unlike a four-wheeled vehicle, loses balance to cause an overturn, which results in an uncontrollable situation due to a loss of function as a steering and braking device, potentially leading to a serious accident.

FIG. 5 is a graph for describing a brake hydraulic pressure. In the graph, A shows a conventional brake system (non-ABS) of a two-wheeled vehicle; C shows a lock point; D is a hydraulic pressure set value pursued in the present invention and shows the maximum value of the brake pressure that is shut off to prevent skidding on a normal road surface; and B shows a variation in hydraulic pressure at which anti-lock and locked states are switched in an electronic antilock brake system (ABS).

In a conventional two-wheeled vehicle brake system (non-ABS), choosing a rear-wheel brake for sudden braking applies a braking force insufficient for adequately for shortening the braking distance due to a decreased friction force between the road surface and the tire, and choosing a front-wheel brake increases the friction force between the road surface and the tire to make the braking force increase, but if the front wheel is locked beyond the lock point B, a vehicle body will become lain on the ground due to a biased load (slip toward lateral road surface within 90 degrees to left or right), which causes loss of function as a steering and braking device, leading to an uncontrollable situation and a potentially serious accident. That is, the area beyond the lock point B in A falls under the skid generating area due to unnecessary excess hydraulic pressure that is hazardous to a rider.

An electronic ABS has clear advantages of excellent operation on a bad road surface as well as a shortened braking distance, but has two disadvantages as follows.

First, it is difficult to mount the electronic ABS unless it is mounted as an option prior to delivering a new two-wheeled vehicle. More specifically, to mount an electronic ABS on a two-wheeled vehicle that has already been delivered, the vehicle body of the two-wheeled vehicle should be remodeled, so it is almost impossible to mount the electronic ABS in view of time and cost. At present, some products with high-class specifications are delivered with the ABS not optional but built-in. It is difficult to estimate the unit factory price of ABS, but is estimated roughly at $1,000.00, and some brands cost more. Thus, it becomes contradictory that a price higher than the price of the motorcycle itself should be paid to mount an ABS on a small low-class motorcycle.

Second, sudden braking in a quick-turn cornering causes slipping due to ABS action and may lead to a serious accident because of an overturn of the motorcycle. In other words, it is commonsense that a quick turn during sudden braking can be made only within the limit of friction force between the road surface and the tire. But even within the limit of friction force, if the motorcycle slips within a very short time with an inertia and centrifugal force applied thereto, slipping that has already started will continue. At this time, even if a hydraulic pressure is reduced with a command of unlocking what was locked from an ECU for an electronic ABS, it is impossible for the motorcycle, for which the slip and overturn has already started, to stop the overturn with the slip suspended and stand up again to drive upright no matter how quickly and greatly the decompression of a brake is provided.

To solve such problems, the applicant filed an application to disclose Korean Patent Application No. 10-2000-0011021 (a mechanical automatic hydraulic control device for an antilock brake system). The above invention deals with the response of the brake system started by the action of a brake pedal or brake lever during a brake action, so that when stopping or reducing the velocity of the vehicle or machine, less than the minimum value of hydraulic pressure for the wheel to be locked is passed in a vehicle in the direction of a wheel cylinder or caliper, and more than the locked pressure is automatically shut off, and in the case of machinery, damage or deformation due to a sudden stop is prevented, so unlike an ordinary brake system or ABS brake system, the hydraulic pressure is increased by stepping on the brake pedal or pulling the brake lever, and the increase of hydraulic pressure is stopped in a state proximate to the lock point, and in such a state the wheel is does not slip and rotates at an optimum speed along with deceleration. Therefore, it has an advantage that the turning of the vehicle body by biased weight of the vehicle body or the skid condition by slipping is minimized during braking.

However, the invention of Korean Patent Application No. 10-2000-0011021 has a problem that the brake function may be lost momentarily due to the breakaway of a control bolt because of an external shock or vibration due to long-term repetitive use.

DISCLOSURE

Technical Problem

Accordingly, to solve the above-mentioned problems, it is an object of the present invention to provide a hydraulic control device for an antilock brake system, in which a control bolt can be limited such that displacement is possible within a certain area so as to maintain a predetermined brake performance despite disturbance or repetitive action.

Technical Solution

In order to accomplish the foregoing objects, according to an embodiment of the present invention, there is provided a hydraulic control device of an antilock brake system including: a body which includes an inlet port and an outlet port, and a cylinder of an internal space formed therein; a piston which is movably installed in the cylinder formed in the body so as to open and close a flow path between the inlet port and the outlet port; a stopper which is integrally fixed to one end of the piston to limit a moving range of the piston by a stopper moving space defined inside of the body; a spring which presses the stopper to apply a restoring force to the piston; a control bolt which is installed in one end of the body to control the restoring force of the spring, wherein the piston includes an opening and closing ring for selectively preventing a flow of a fluid therethrough and a sealing ring for sealing the fluid, which are placed on an outer periphery thereof, the body includes an inlet flow path which has a cross section smaller than that of the piston, and is formed on a piston head side of the other end portion of the piston to communicate with the inlet port, the piston head includes a first gap communicated with the inlet flow path and a second gap communicated with the first gap and the outlet port, which are formed an upper periphery thereof, and when the opening and closing ring contacts with a limit projection formed in the body facing the piston between the first gap and the second gap, the flow of the fluid therebetween is prevented.

In the present invention, the control bolt may include a pin seat hole formed on a side portion thereof, and a fixed pin may be inserted in the pin seat hole which is penetrated in the body.

In the present invention, a length of the pin seat hole in a direction parallel to an advancing direction of the control bolt may be larger than the diameter of the fixed pin.

Advantageous Effects

The device of the present invention, based on the principle that effective braking is maximized in a state without slipping by the rolling friction proximate to the lock point of a brake rather than the skid friction of the wheel, that is, when braking while maintaining the slip rate at zero (0), effectively maintains the hydraulic pressure of a brake proximate to the lock point which can be calculated by considering the weight of the vehicle body and average running speed when a rider has stepped on the brake pedal or pulled the brake lever.

The device of the present invention ensures steerability and minimizes the braking distance at normal times, prevents the unsteerable condition of the vehicle body due to eccentricity of the vehicle body on a snowy road or rainy road as performance is improved by fast response of hydraulic pressure, and can allow stable braking without vibration of a brake pedal during braking.

The device of the present invention, unlike an ordinary brake system or ABS brake system, has hydraulic pressure increased by stepping on the brake pedal or pulling the brake lever and the increase of hydraulic pressure is stopped in a state proximate to the lock point, and since the wheels rotate at an optimum speed with almost no slip in such a state, the vehicle body being turned by the biased weight of the vehicle body during braking or the skid condition by slipping can be minimized.

Further, the device of the present invention ensures that braking ability is not lost under any situation, so that it is possible to prevent accidents due to a brake inoperable condition generated as a result of a malfunction of the hydraulic control device for an antilock brake system.

In particular, the device of the prevent invention can be mounted at a low price on a small or low-class motorcycle as well, thereby excellent performance can be displayed as in a high-class ABS, so it can be said that it is an optimum brake system in the field of low-price two-wheeled vehicles, in the viewpoint that a rider's safety can be ensured at low cost.

BEST MODE

Figure 1:
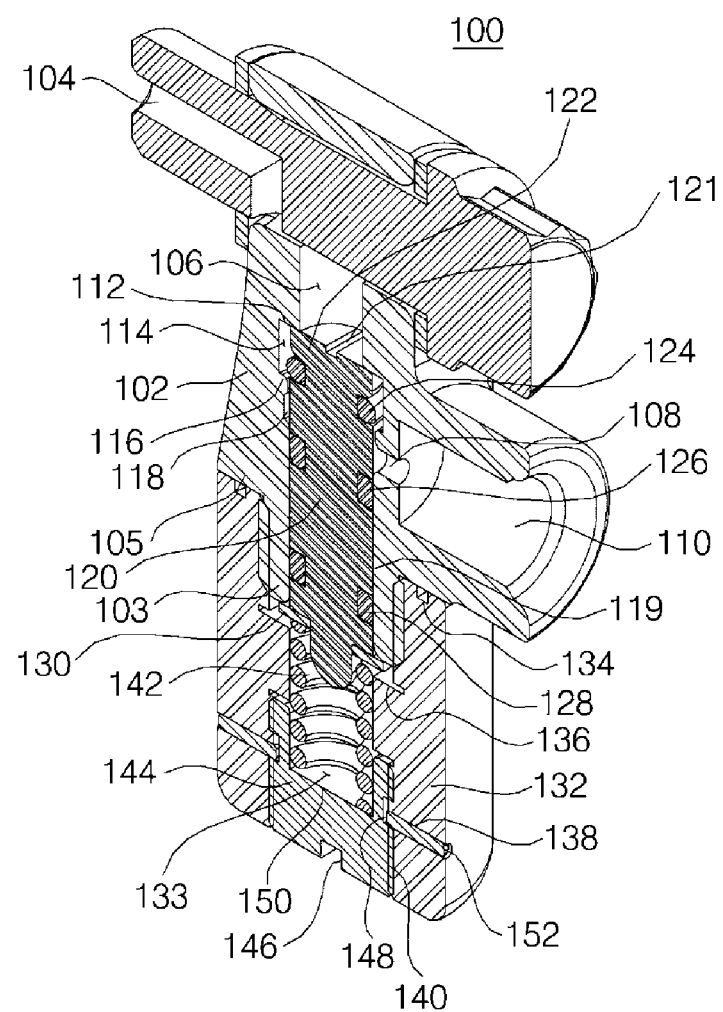
FIG. 1 is a partially cutaway view of a hydraulic control device of an antilock brake system according to an embodiment of the present invention.

Hereinafter, preferable embodiments of the present invention will be described with reference to the accompanying drawings. Referring to the drawings, wherein like reference characters designate like or corresponding parts throughout the several views. In the embodiments of the present invention, a detailed description of publicly known functions and configurations that are judged to be able to make the purport of the present invention unnecessarily obscure are omitted.

Figure 2:
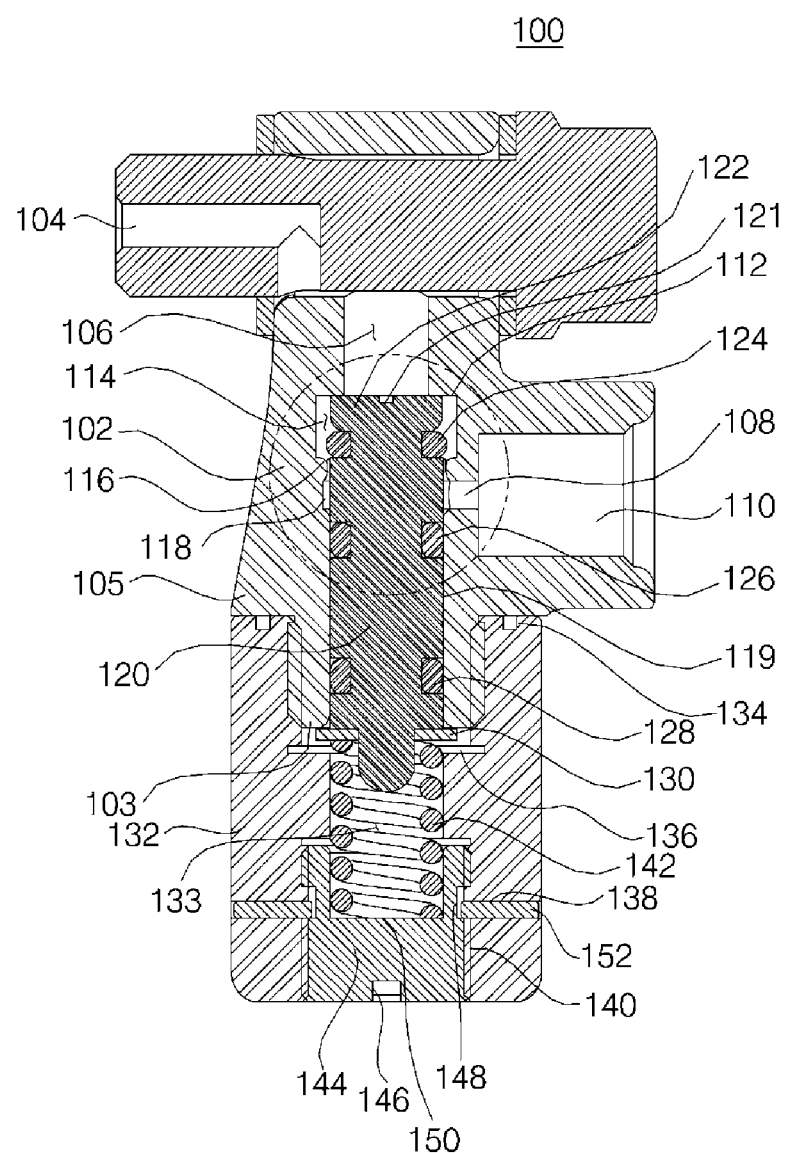
FIG. 2 is a cross sectional view of the hydraulic control device of an antilock brake system of FIG. 1.

FIGS. 1 and 2 show a hydraulic control device 100 of an antilock brake system according to an embodiment of the present invention, respectively.

The hydraulic control device 100 of an antilock brake system includes a body provided with a first housing 102 and a second housing 132, a piston 120 inserted in the body, a spring 142 for applying an elastic force to the piston 120, and a control bolt 144 for controlling an elastic force of the spring 142.

The body is manufactured by being divided into the first housing 102 and the second housing 132 for convenience in injection molding and assembling processes, but the body may be manufactured by a single part. The first housing 102 includes an inlet port 104 formed in an upper side thereof, and an outlet port 110 formed in a side portion thereof. That is, the inlet port 104 is arranged on a piston head 122 side which is an end portion of the piston 120, and the outlet port 110 is arranged on the side portion of the piston 120.

In addition, the first housing 102 and the second housing 132 may be coupled by screwing or welding to each other. In the embodiment of the present invention, the inlet port 104 and the outlet port 110 are formed in the upper and side portion of the first housing 102, while a first stopper seat 103 which is a top dead center of the stopper 130 is formed in a lower portion of the first housing 102 which will be described below. To prevent a leakage of fluid as much as possible, it is preferable that a position where a first housing joint portion 105 of the first housing 102 and a second housing joint portion 134 of the second housing 132 meet be different from the height of the first stopper seat 103.

The first housing 102 includes a cylinder 119 formed therein so as to reciprocate the piston 120 in a longitudinal direction thereof by a hydraulic pressure applied thereto. The cylinder 119 is connected with an inlet flow path 106 formed on an upper side thereof, and the inlet flow path 106 is communicated with the inlet port 104.

The cylinder 119 has a cross section which is formed larger than that of the inlet flow path 106. Therefore, a stepped piston seat 112 is formed on an upper end of the cylinder 119. The piston seat 112 corresponds to the top dead center of the piston 120. The piston head 122 is seated on the piston seat 112 under the condition that there is no fluid supplied through the inlet port 104 or a fluid pressure applied thereto is lower than a restoring force of the spring 142.

The cylinder 119 includes a first gap 114 and a second gap 118 which are formed on an upper periphery thereof with a bigger cross section than that of the piston 120 so as to flow the fluid therethrough. In addition, a limit projection 116 is formed in the first hosing between the first gap 114 and the second gap 118 to be contact with a first ring 124 which will be described below. The limit projection 116 has a gap formed between the outer surface thereof and the piston 120 with a size narrower than the first gap 114 and the second gap 118. Therefore, it is possible to flow the fluid from the first gap 114 to the second gap 118, unless the first ring 124 contacts with the limit projection.

The first housing includes an outlet hole 108 formed therein at a side of the second gap 118. Therefore, the second gap 118 is communicated with the outlet port 110 through the outlet hole 108.

The piston 120 includes a piston head groove 121 formed on the upper periphery thereof. The piston head groove 121 has a roll of communicating the first gap 114 with the inlet flow path 106.

The piston 120 is provided with at least two or more O-rings inserted in grooves formed on an outer periphery thereof. In the embodiment of the present invention, a first ring 124, a second ring 126, and a third ring 128 are employed. The first ring (an opening and closing ring) 124 is positioned in the first gap 114, and has a cross section shape and size capable to contact to the limit projection 116. Therefore, the first ring 124 has a role of an opening and closing valve for selectively preventing the fluid from flowing to the second gap 118. In addition, the second ring 126 and the third ring 128 are placed under the second gap 118 with contact to an inner wall of the cylinder 119. The second ring 126 and the third ring 128 have a roll of a sealing ring for preventing the fluid from flowing to the lower side from the second gap 118. Herein, in order to improve the sealing effects, two O-rings are used.

The spring 142 is inserted in the second housing 132, and an upper end of the spring 142 contacts with a stopper 130. The stopper 130 is joined to a lower end portion of the piston 120 to be pressed by the spring. In addition, a second stepped stopper seat 136 is formed in an upper portion of a spring hole 133 of the second housing 132 in which the spring 142 is inserted so as to contact with the stopper 130. Since the stopper 130 has a cross section larger than the spring hole 133 and the cylinder 119, it is possible to move within a stopper moving space defined between the first stopper seat 103 and the second stopper seat 136. Since the stopper 130 contacts with the first stopper seat 103 while the piston head 122 contacts with the piston seat 112, the first stopper seat 103 may be omitted.

The second housing 132 is provided with a control bolt hole 140 formed in a lower end portion thereof to be screwed with the control bolt 144. The control bolt 144 contacts with the spring 142 to have a role of controlling a reference restoring force of the spring 142. In order to easily fix the spring 142, the control bolt 144 may include a spring fixed portion 150 concavely formed on an upper end thereof to be inserted in the lower end portion of the spring 142. Further, the control bolt 144 is provided with a control groove 146 for rotating the control bolt 144 by a tool.

There is a risk that the control bolt 144 is separated from the control bolt hole 140 due to a disturbance or repetitive action. For this, in the present invention, a pin seat hole 148 is formed on an outer surface of the control bolt 144, and a pin hole 138 is formed in the second housing 132 at a position corresponding to the pin seat hole 148. A fixed pin 152 is inserted into the pin hole 138. Therefore, if an end portion of the fixed pin 152 is inserted into the pin seat hole 148, the movement of the control bolt 144 in the longitudinal direction thereof is restricted thereby. In this regard, a length of the pin seat hole 148 in a direction parallel to an advancing direction of the control bolt 144 is larger than the diameter of the fixed pin 152. Accordingly, even if the end portion of the fixed pin 152 is fixed to the pin seat hole 148 of the control bolt 144, the control bolt 144 can be moved within an allowable range of the pin seat hole 148 in the front and back. As a result, it is possible to prevent the control bolt 144 from being separated from the control bolt hole 140 by the fixed pin 152, without affecting the control of the restoring force of the spring 142 by a fine adjustment of the control bolt 144.

The hydraulic control device of an antilock brake system according to the embodiment of the present invention is basically configured as described above. Hereinafter, an operation process of the hydraulic control device 100 of an antilock brake system will be described.

Figure 3:
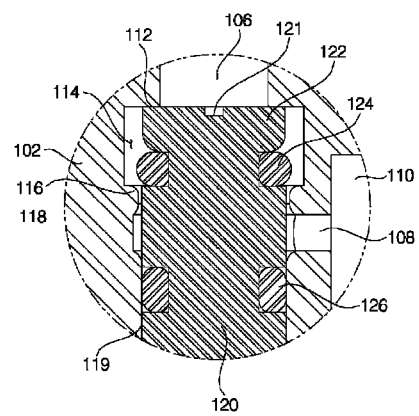
FIG. 3 is a partially enlarged view of a fluid shut-off state in FIG. 2.
Figure 4:
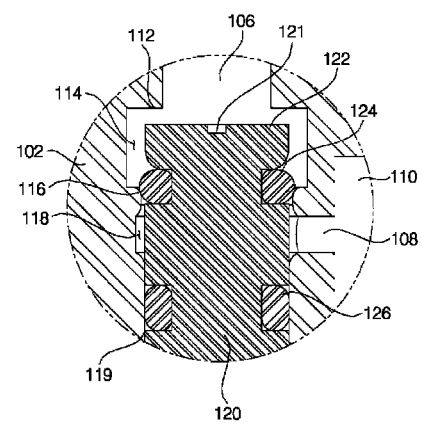
FIG. 4 is a partially enlarged view of a fluid maximum state in FIG. 2.
Figure 5:
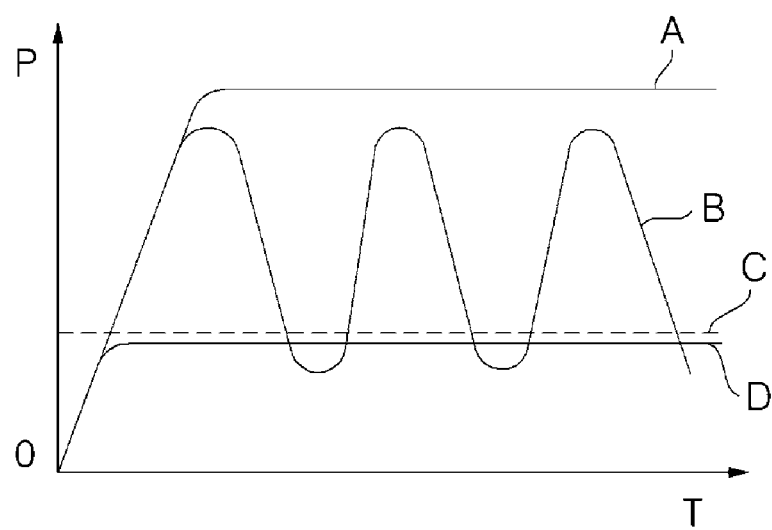
FIG. 5 is a graph for describing a brake hydraulic pressure.

FIG. 3 shows the state that a brake (not shown) is not operated in the hydraulic control device 100 of an antilock brake system. At this time, the piston head 122 is positioned in contact with the piston seat 112. Therefore, the inlet port 104 is communicated with the outlet port 110 through the inlet flow path 106, the piston head groove 121, the first gap 114, the second gap 118 and the outlet hole 108.

Thereafter, if a user steps on the brake pedal or pulls a brake lever, the piston 120 is shifted into reverse by a hydraulic fluid flowing into the inlet flow path 106 through the inlet port 104 against the restoring force of the spring 142. Accordingly, the piston head 122 is separated from the piston seat 112, while a space communicated between the inlet flow path 106 and the first gap 114 extends. As a result, the flow rate of the hydraulic fluid flowing between the inlet port 104 and the outlet port 110 increases. As the pressure of the hydraulic fluid becomes high, the separation length of the piston head 122 from the piston seat 112 increases, and thereby the hydraulic fluid flows into a wheel cylinder. Therefore, if a user further steps on the brake pedal or pulls the brake lever, the hydraulic pressure to the inlet port 104 increases, and thereby the piston 120 is further shifted into reverse. In this state, if the hydraulic pressure is close to the lock point, the first ring 124 of the piston 120 contacts the limit projection 116 by a value of the compressive force of the spring 142 input by controlling the control bolt 144. As a result, the flowing of the hydraulic fluid from the first gap 114 to the second gap 118 is prevented. That is, the inlet port 104 is disconnected with the outlet port 110.

In this state, even if the user further deeply steps on the brake pedal or strongly pulls a brake lever, there is no inflow of the hydraulic pressure to be applied to the wheel cylinder, and thereby the hydraulic pressure is not increased any more.

Meanwhile, the elastic force of the spring 142 which elastically presses the piston 120 on the rear side of the piston 120 can be controlled by tightening or loosening the control bolt 144. The elastic force of the spring 142 is controlled in consideration of the mean running speed of a vehicle and the weight of the vehicle body, and a proper elastic force immediately coincides with the hydraulic pressure close to the lock point of the break.

In addition, even if a disturbance is applied to the system, since the fixed pin 152 is inserted in the pin seat hole 148 formed in the control bolt 144, the situation that the control bolt 144 is separated from the control bolt hole 140 does not occur.

While the present invention has been described with reference to the preferred embodiments, it will be understood by those skilled in the related art that various modifications and variations may be made therein without departing from the scope of the present invention as defined by the appended claims.

DESCRIPTION OF REFERENCE NUMERALS

100: hydraulic control device of an antilock brake system
102: first housing,
103: first stopper seat
104: inlet port,
105 first housing joint portion
106: inlet flow path,
108 outlet hole
110: outlet port,
112: piston seat
114: first gap,
116: limit projection
118: second gap,
119: cylinder
120: piston,
121: piston head groove
122: piston head,
124: first ring
126: second ring,
128: third ring
130: stopper,
132: second housing
133: spring hole,
134: second housing joint portion
136: second stopper seat,
138: pin hole
140: control bolt hole,
142: spring
144: control bolt,
146: control groove
148: pin seat hole,
150: spring fixed portion
152: fixed pin

The invention claimed is:

1. A hydraulic control device of an antilock brake system comprising:
a body which includes an inlet port and an outlet port, and a cylinder of an internal space formed therein;
a piston which is movably installed in the cylinder formed in the body so as to open and close a flow path between the inlet port and the outlet port;
a stopper which is integrally fixed to one end of the piston to limit a moving range of the piston by a stopper moving space defined inside of the body;
a spring which presses the stopper to apply a restoring force to the piston; and
a control bolt which is installed in one end of the body to control the restoring force of the spring,
wherein the piston includes an opening and closing ring for selectively preventing a flow of a fluid therethrough and a sealing ring for sealing the fluid, which are placed on an outer periphery thereof,
the body includes an inlet flow path which has a cross section smaller than that of the cylinder and is formed on a piston head side of the other end portion of the piston to communicate with the inlet port, and a stepped piston seat is formed on an upper end of the cylinder,
the cylinder includes a first gap communicated with the inlet flow path and a second gap communicated with the first gap and the outlet port, which are formed on an upper periphery thereof,
the piston includes a piston head groove formed on the upper periphery thereof, and configured to allow the first gap to communicate with the inlet flow path,
the piston head is seated on the piston seat under the condition that there is no fluid supplied through the inlet port or a fluid pressure applied thereto is lower than a restoring force of the spring, and
when the opening and closing ring contacts with a limit projection formed in the body facing the piston between the first gap and the second gap, the flow of the fluid therebetween is prevented.

2. The device according to claim 1, wherein the control bolt includes a pin seat hole formed on a side portion thereof, and a fixed pin is inserted in the pin seat hole which is penetrated in the body.

3. The device according to claim 2, wherein a length of the pin seat hole in a direction parallel to an advancing direction of the control bolt is larger than the diameter of the fixed pin.

* * * * *